H. J. MURPHY.
GREASE CUP.
APPLICATION FILED MAY 27, 1919.
1,335,521.
Patented Mar. 30, 1920.
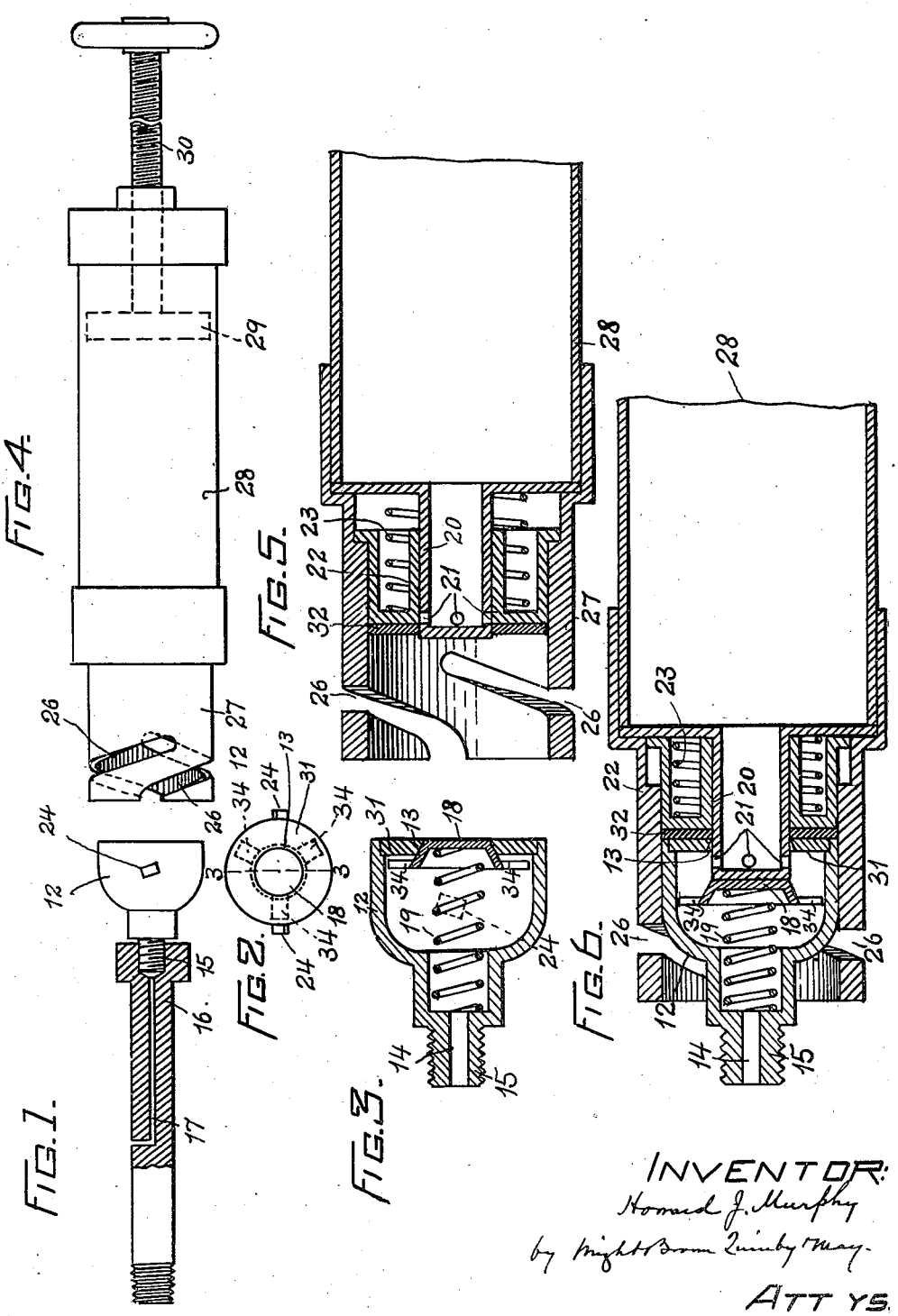
INVENTOR:
Howard J. Murphy
by Wright Brown Quimby May
ATTYS.

UNITED STATES PATENT OFFICE.

HOWARD J. MURPHY, OF READING, MASSACHUSETTS.

GREASE-CUP.

1,335,521.  Specification of Letters Patent.  Patented Mar. 30, 1920.

Application filed May 27, 1919. Serial No. 300,173.

*To all whom it may concern:*

Be it known that I, HOWARD J. MURPHY, a citizen of the United States, residing at Reading, in the county of Middlesex and State of Massachusetts, have invented new and useful Improvements in Grease-Cups, of which the following is a specification.

This invention relates to a grease cup which is attachable to a carrying part requiring lubrication, and is provided at one end with a grease inlet, and at its opposite end with a grease outlet communicating with the surfaces to be lubricated.

The object of the invention is to provide a grease cup, the grease inlet of which is normally closed by an inwardly displaceable spring-pressed valve, adapted to be displaced by a part of a grease gun, the cup being provided with an element of grease-gun-advancing means causing the displacement of the valve by a grease gun of appropriate construction, and with a member operable by the advancement of the gun to displace a valve controlling the discharge of grease from the gun.

The invention is embodied in the improvements which I will now proceed to describe and claim.

Of the accompanying drawings forming a part of this specification,—

Figure 1 is a side view of a grease cup embodying the invention, connected with a carrying part lubricated by the cup.

Fig. 2 is an end view of the cup.

Fig. 3 is a section on line 3—3 of Fig. 2.

Fig. 4 is a side view of a grease gun adapted to coöperate with the cup.

Fig. 5 is a longitudinal section of a portion of the grease gun.

Fig. 6 is a sectional view showing the gun engaged with, and communicating with the cup to force grease into the cup.

The same reference characters indicate the same parts in all of the figures.

12 represents a grease cup having a grease inlet 13 at its outer end, the opposite end of the cup being attachable to a carrying part and provided with a grease outlet 14, which is preferably formed in a threaded nipple 15, adapted to be screwed into a tapped socket in a carrying part 16 to be lubricated. The carrying part as here shown, is a bolt adapted to be inserted in a socket formed in an end of a vehicle spring, and provided with a grease duct 17 communicating with the periphery of the bolt. It is obvious, however, that the carrying part may be otherwise constructed.

The grease inlet 13 is circular and its margin is formed as a valve seat.

18 represents an inwardly displaceable valve within the cup, adapted to close the inlet 13, the valve and the seat formed by the inlet being preferably tapered, as shown by Fig. 3.

The valve is adapted to be displaced inwardly into the cup, and is normally closed against its seat by a spring 19, as shown by Fig. 3.

The valve 18 is displaceable by a grease gun nozzle 20, and the cup is provided with a cylindrical external surface adapted to guide and permit the rotation of the grease gun. On said external surface is an element of means for advancing the grease gun in such manner as to cause the nozzle 20 to displace the valve, as indicated by Fig. 6.

The grease gun nozzle is formed to enter the grease inlet 13, and is provided with outlet ports 21 which are normally closed by a valve 22 held yieldingly in the position shown by Fig. 5, by a spring 23. The said element as shown here, is embodied in a pair of oppositely projecting and oppositely inclined lugs 24, projecting from opposite sides of the cup and formed to coöperate with helical slots 26 formed in a tubular extension 27 of the grease gun barrel 28, the arrangement being such that when the grease gun is moved endwise to engage its slots with the lugs 24, and then given a partial rotation, the gun is advanced endwise relatively to the fixed cup to the position shown by Fig. 6, the nozzle 20 being thus caused to displace the valve 18, and enter the cup, so that its ports 21 are within the cup. The gun is now adapted to be operated by advancing its piston 29 by means of the screw-threaded piston-rod 30, engaged with a tapped socket in the head of the gun. This advancement of the piston forces grease through the nozzle and into the cup.

The cup is provided at its outer end with a displacing member, operable by the advancement of the grease gun to displace the annular valve 22 on the grease gun nozzle, and thus uncover the grease ports 21. Said end member as here shown, is an annular head 31 fixed to the cup and surrounding the grease inlet 13, said head being adapted to bear on a washer 32 covering the annular outer end of the valve 22.

It will now be seen that the cup is adapted to engage a portion of the grease gun, and to coöperate with said portion in causing an endwise advancement of the gun when the latter is rotated, the advancement of the gun causing the simultaneous displacement of the cup valve 18 and of the nozzle valve 22.

The grease gun constructed as described will form the subject of another application.

A backward rotation of the grease gun causes its disengagement from the cup and permits the closing of the cup valve 18 by its spring 19, and the closing of the nozzle valve 22 by its spring 23.

The cup valve 18 and the end member 31 have flat outer surfaces which are flush with each other when the valve is closed, so that said surfaces may be simultaneously wiped to remove dirt therefrom before the gun is engaged with the cup.

The cup valve is provided with spaced apart ears 34, the outer ends of which are in sliding contact with the inner surface of the cup to guide the valve 18, and prevent it from moving edgewise when removed from its seat. The force of the spring 19 should be sufficient to enable it to close the valve upon its seat against the resistance offered by grease left by the gun between the valve and the seat. The ears 34 are formed to be forced by the spring 19 through an accumulation of grease in the cup.

It is obvious that the lubricating material may be relatively hard grease, or a fluid oil, the described construction being particularly adapted for use with the grease.

The lugs 24 constitute the equivalent of quick pitch male screw threads adapted to coöperate, in advancing a grease gun, with the equivalent of female screw threads formed by helical slots 26 in a part of the gun, the arrangement being such that a partial rotation of the grease gun on its longitudinal axis imparts an endwise movement of sufficient amplitude to the gun. One lug 24 and one slot 26 may be employed instead of two.

I claim:

1. A grease cup having a grease inlet at its outer end, formed as a valve seat, the opposite end of the cup being attachable to a carrying part, and provided with a grease outlet, an inwardly displaceable valve within the cup formed to closely fit said seat, a valve closing spring within the cup, the cup valve being displaceable by a grease gun nozzle, and the cup being provided with a grease gun-guiding external surface having an element of grease-gun engaging and advancing means permitting the displacement of the cup valve by a grease gun, and at its outer end with a displacing member operable by the advancement of a grease gun to displace a grease gun valve.

2. A grease cup having a grease inlet at its outer end, formed as a valve seat, the opposite end of the cup being attachable to a carrying part, and provided with a grease outlet, an inwardly displaceable valve within the cup formed to closely fit said seat, a valve closing spring within the cup, the cup valve being displaceable by a grease gun nozzle, and the cup being provided with a grease gun-guiding external surface having outwardly projecting oppositely inclined lugs adapted to coöperate with helical grooves in a grease gun extension, to advance a grease gun, and cause the opening of the cup valve by a part of the gun, and with an annular end member surrounding the valve seat and operable by the advancement of the grease gun to displace a nozzle-closing valve on the gun.

3. A grease cup substantially as specified by claim 1, the cup valve being provided with spaced apart guiding ears in sliding contact with the inner surface of the cup, and formed to be forced by said spring through an accumulation of grease in the cup.

4. A grease cup having a grease inlet at its outer end, formed as a valve seat, the opposite end of the cup being attachable to a carrying part, and provided with a grease outlet, an inwardly displaceable valve within the cup adapted to close said inlet, a valve-closing spring within the cup, the cup valve being displaceable by a grease gun nozzle, and the cup being provided on its external surface with a quick thread screw element adapted to coöperate with a complemental element on a grease gun in displacing the cup valve.

5. A grease cup attachable to a carrying part and having a grease gun-guiding external surface, and an element of means on said surface for engaging and advancing a grease gun guided thereby, the outer end of the cup being provided with means coöperating with said engaging and advancing means in displacing a valve in a grease gun advanced upon the cup, and with a grease inlet formed as a valve seat and adapted to receive a grease gun nozzle, the cup being provided internally with a spring-closed valve, adapted to fit said seat and to be displaced by an advancing grease-gun nozzle.

In testimony whereof I have affixed my signature.

HOWARD J. MURPHY.